(12) United States Patent
Okada

(10) Patent No.: US 10,230,889 B2
(45) Date of Patent: Mar. 12, 2019

(54) UNMANNED AERIAL VEHICLE AND CONTROL METHOD

(71) Applicant: Panasonic Intellectual Property Corporation of America, Torrance, CA (US)

(72) Inventor: Masashi Okada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 80 days.

(21) Appl. No.: 15/373,505

(22) Filed: Dec. 9, 2016

(65) Prior Publication Data

US 2017/0187952 A1    Jun. 29, 2017

(30) Foreign Application Priority Data

Dec. 24, 2015  (JP) .................................. 2015-250847
Sep. 1, 2016   (JP) .................................. 2016-170719

(51) Int. Cl.
*H04N 5/232*    (2006.01)
*G06K 9/00*     (2006.01)
(Continued)

(52) U.S. Cl.
CPC ....... *H04N 5/23216* (2013.01); *B64C 39/024* (2013.01); *B64D 47/08* (2013.01);
(Continued)

(58) Field of Classification Search
CPC ............. H04N 5/23216; H04N 5/2251; H04N 5/23203; H04N 5/23206; H04N 5/2328; H04N 7/185; B64C 39/024; B64D 47/08; F16M 11/105; F16M 11/18; F16M 11/2064; F16M 13/02; G03B 15/006; G06K 9/00771
(Continued)

(56) References Cited

U.S. PATENT DOCUMENTS

2014/0344952 A1*  11/2014  Kulick ................ G06F 21/6245
                                                              726/28
2015/0120750 A1*  4/2015   Hefeeda ............ G06F 17/30961
                                                              707/741
(Continued)

FOREIGN PATENT DOCUMENTS

JP          2007-104254          4/2007

*Primary Examiner* — Huy T Nguyen
*Assistant Examiner* — Jae N Noh
(74) *Attorney, Agent, or Firm* — Greenblum & Bernstein, P.L.C.

(57) ABSTRACT

An unmanned aerial vehicle includes: a photographic-device mounting portion to which a photographic device is mounted; a communicator that communicates with the photographic device; and an authentication processor that performs authentication on the photographic device by using the communicator and that determines whether or not the photographic device is a legitimate device that satisfies a predetermined aerial photography requirement. Upon determining that the photographic device is not a legitimate device, the authentication processor performs operation limitation on a predetermined function of the unmanned aerial vehicle so that the photographic device is incapable of performing aerial photography.

18 Claims, 12 Drawing Sheets

(51) Int. Cl.
*H04N 7/18* (2006.01)
*H04N 5/225* (2006.01)
*B64C 39/02* (2006.01)
*B64D 47/08* (2006.01)
*F16M 13/02* (2006.01)
*G03B 15/00* (2006.01)
*F16M 11/10* (2006.01)
*F16M 11/18* (2006.01)
*F16M 11/20* (2006.01)

(52) U.S. Cl.
CPC .......... *F16M 11/105* (2013.01); *F16M 11/18* (2013.01); *F16M 11/2064* (2013.01); *F16M 13/02* (2013.01); *G03B 15/006* (2013.01); *G06K 9/00771* (2013.01); *H04N 5/2251* (2013.01); *H04N 5/2328* (2013.01); *H04N 5/23203* (2013.01); *H04N 5/23206* (2013.01); *H04N 7/185* (2013.01)

(58) Field of Classification Search
USPC ........................................................ 348/144
See application file for complete search history.

(56) References Cited

U.S. PATENT DOCUMENTS

2017/0190423 A1* 7/2017 Salgueiro ................ B64D 1/00
2018/0082308 A1* 3/2018 Gong .................... H04L 67/12

* cited by examiner

UNMANNED AERIAL VEHICLE AND CONTROL METHOD

BACKGROUND

1. Technical Field

The present disclosure relates to a control method for an unmanned aerial vehicle used for aerial photography and having a mounting portion for a photographic device. In particular, the present disclosure relates to a technique in which an unmanned aerial vehicle controls aerial photography performed by a photographic device mounted to a mounting portion.

2. Description of the Related Art

A camera unit that performs photography when falling has been disclosed as a related technique for controlling aerial photography based on a remote operation (see Japanese Unexamined Patent Application Publication No. 2007-104254). The camera unit disclosed in Japanese Unexamined Patent Application Publication No. 2007-104254 has an orientation stabilizing means used when it is falling or thrown and a camera module that serves as an image capturing means, and the camera unit enables remote control from an external control unit through mutual authentication with the control unit.

SUMMARY

The above-described related technique discloses authentication between the camera unit and the control unit, but does not describe authentication between the camera module (a photographic device) and the camera unit, thus requiring a further improvement in aerial photography using a photographic device mounted to a mounting portion of an unmanned aerial vehicle.

One non-limiting and exemplary embodiment provides an unmanned aerial vehicle that can limit aerial photography performed by a photographic device and a control method therefor when the photographic device is not a legitimate device that satisfies a predetermined aerial photography requirement.

In one general aspect, the techniques disclosed here feature an unmanned aerial vehicle that performs flight based on a remote operation from a control unit or that performs autonomous flight. The unmanned aerial vehicle includes: a mounting portion to which a photographic device is mounted; a communicator that communicates with the photographic device; and an authentication processor that performs authentication on the photographic device by using the communicator and that determines whether or not the photographic device is a legitimate device that satisfies a predetermined aerial photography requirement. Upon determining that the photographic device is not a legitimate device, the authentication processor performs operation limitation on a predetermined function of the unmanned aerial vehicle so that the photographic device is incapable of performing aerial photography.

It should be noted that general or specific embodiments may be implemented as a system, an apparatus, a device, an integrated circuit, a computer program, a recording medium such as a computer-readable compact disc read-only memory (CD-ROM), or any selective combination thereof.

According to the present disclosure, when the photographic device is not a legitimate device that satisfies a predetermined aerial photography requirement, an operation limitation is performed on a predetermined function of the unmanned aerial vehicle to thereby make it possible to limit aerial photography performed by the illegitimate photographic device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Knowledge Underlying Present Disclosure)

Figure 1:
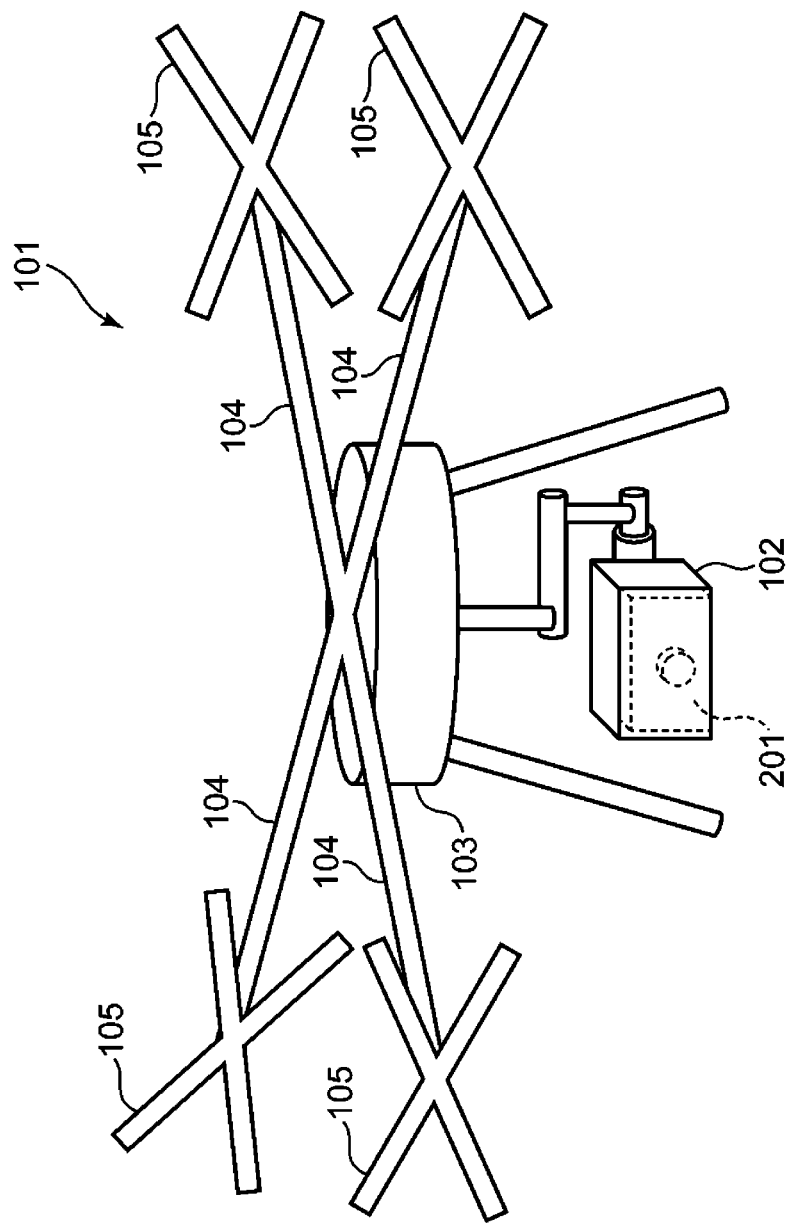
FIG. 1 is an external view illustrating one example of an unmanned aerial vehicle in a first embodiment of the present disclosure.

In recent years, with the reduced prices and the widespread use of unmanned aerial vehicles, aerial photography can be performed more easily than before by using photographic devices mounted to the unmanned aerial vehicles. Meanwhile, aerial photography using the photographic devices mounted to the unmanned aerial vehicles can also easily perform photography at places where photography was difficult in the past, such as the premises of personal residences, and thus needs for privacy protection for video and so on acquired by the photography have been discussed.

In particular, when the acquired video is posted on the Internet, it is necessary to give particular consideration, such as blurring a portion where privacy can be violated, and thus creation of a guideline is underway. Examples of the portion where privacy can be violated include a human face, a license plate, and a residence.

Also, there are problems with aerial photography involving risks, for example, aerial photography in no-fly zones, such as densely built-up areas, and aerial photography in places where many people gather, such as festivals and outdoor meetings. There are cases in which such an aerial photography action and an action of posting the video of aerial photography on the Internet are illegal.

As described above, the camera unit disclosed in Japanese Unexamined Patent Application Publication No. 2007-104254 has an orientation stabilizing means used when it is falling or thrown and a camera module that serves as an image capturing means, and the camera unit enables remote control from an external control unit through mutual authentication with the control unit. Although the technique in Japanese Unexamined Patent Application Publication No. 2007-104254 describes the authentication between the camera and the control unit, photography from the above is still possible when a camera module used to perform illegitimate aerial photography that does not comply with the aforementioned privacy protection and so on.

As a possible method for the privacy protection, the photographic device that performs aerial photography may have a function for performing image recognition processing to determine a portion that violates privacy and automatically applying blur to the portion. With this method, it is possible to perform blurring processing on specific image regions, such as a human face, a car license plate, and a residence, thus protecting privacy.

Also, a method in which information, such as the individual identification number of the unmanned aerial vehicle, that can ensure traceability of acquired video is embedded into the video is conceivable as a means for regulating and checking illegal aerial photography actions. With this method, when video acquired by the aerial photography is posted on the Internet, an investigating authority can identify the vendor of the unmanned aerial vehicle and the individual identification number of the unmanned aerial vehicle, and further can identify the photographing person, thus making it possible to give a warning to or file a criminal case against the photographing person.

Accordingly, it is necessary to regulate aerial photography actions using a photographic device that does not have a video privacy protection function as described above or a traceability ensuring function as described above. To this end, in the present disclosure, only a photographic device having a function as described above is regarded as a legitimate device, and when the unmanned aerial vehicle fails to verify the authenticity of a photographic device, the unmanned aerial vehicle performs an operation limitation on a predetermined function thereof to thereby regulate and check an undesirable aerial photography action.

An unmanned aerial vehicle according to one aspect of the present disclosure is directed to an unmanned aerial vehicle that performs flight based on a remote operation from a control unit or that performs autonomous flight. The unmanned aerial vehicle includes: a mounting portion to which a photographic device is mounted; a communicator that communicates with the photographic device; and an authentication processor that performs authentication on the photographic device by using the communicator and that determines whether or not the photographic device is a legitimate device that satisfies a predetermined aerial photography requirement. Upon determining that the photographic device is not a legitimate device, the authentication processor performs operation limitation on a predetermined function of the unmanned aerial vehicle so that the photographic device is incapable of performing aerial photography.

According to this configuration, the authentication processor communicates with the photographic device via the communicator to determine whether or not the photographic device mounted to the mounting portion of the unmanned aerial vehicle is a legitimate device. When the authentication fails or it is determined that the photographic device is a legitimate device, the operation limitation is performed on the predetermined function of the unmanned aerial vehicle, thus disabling ordinary aerial photography. As a result, when the photographic device is not a legitimate device that satisfies a predetermined aerial photography requirement, an operation limitation is performed on a predetermined function of the unmanned aerial vehicle to thereby make it possible to limit aerial photography performed by the illegitimate photographic device.

The mounting portion may include a changing portion that changes a photography direction of the photographic device in accordance with a remote operation from the control unit; and upon determining that the photographic device is not a legitimate device, the authentication processor may limit the change of the photography direction of the photographic device so that the photographic device is incapable of performing aerial photography.

According to this configuration, when aerial photography is attempted using an illegitimate photographic device, the photography direction cannot be changed by a remote operation, and a photographing person cannot perform photography to acquire desired video.

Upon determining that the photographic device is not a legitimate device, the authentication processor may control the changing portion so as to fix the photography direction of the photographic device to a specific direction in which the photographic device is incapable of performing aerial photography.

According to this configuration, when aerial photography is attempted using the illegitimate photographic device, it is difficult for the photographing person to perform photography to acquire desired video, since the photography direction of the photographic device is fixed to the specific direction in which the photographic device is incapable of performing aerial photography.

The specific direction may be a bottom surface direction of the unmanned aerial vehicle.

According to this configuration, when aerial photography is attempted using the illegitimate photographic device, the video acquired by the aerial photography becomes visually meaningless, since the photography direction of the photographic device is fixed to the bottom surface of the unmanned aerial vehicle.

The mounting portion may include a stabilizing portion that reduces motion blur in a moving image during aerial photography of the photographic device; and upon determining that the photographic device is a legitimate device, the authentication processor may control the stabilizing portion so as not to reduce motion blur in a moving image during aerial photography of the photographic device.

According to this configuration, when aerial photography is attempted using an illegitimate photographic device, the video that is acquired includes a large amount of motion blur, thus making it difficult for the photographing person to acquire desired video.

Upon determining that the photographic device is not a legitimate device, the authentication processor may limit the remote operation from the control unit to the unmanned aerial vehicle.

According to this configuration, when aerial photography is attempted using an illegitimate photographic device, the unmanned aerial vehicle cannot be made to fly by a remote operation.

Upon determining that the photographic device is not a legitimate device, the authentication processor may change a flight of the unmanned aerial vehicle to an autonomous flight.

According to this configuration, when it is determined that the photographic device is not an illegitimate device during flight, the unmanned aerial vehicle is guided to a safe state through autonomous flight.

The aerial photography requirement may be to embed, into video data acquired by the photographic device, photography condition information for tracking history of the video data acquired by the photographic device; and upon determining that the photographic device is a legitimate device, the authentication processor may control the photographic device so as to embed the photography condition information obtained from the unmanned aerial vehicle via the communicator into the video data acquired by the photographic device.

According to this configuration, when it is determined that the photographic device is a legitimate device, it is possible to track history of the video data, since the photography condition information for tracking the history of the video data acquired by the photographic device is embedded into the video data acquired by the photographic device. That is, since the photography condition information, which leads to identifying the photographing person, is included in the video data, it is possible to check executing dangerous or illegitimate aerial photography, and it is possible to further check posting video or the like acquired thereby on the Internet.

The aerial photography requirement may be to embed the photography condition information into the video data acquired by the photographic device, by using digital watermarking; and upon determining that the photographic device is a legitimate device, the authentication processor may control the photographic device so as to embed the photography condition information into the video data by using the digital watermarking.

According to this configuration, when it is determined that the photographic device is a legitimate device, history of the video data acquired by the photographic device can be tracked without a decrease in the quality of the video data, since the photography condition information for tracking the history of the video data is embedded into the video data by using digital watermarking.

The photography condition information may be individual identification information with which the unmanned aerial vehicle is uniquely identifiable; and upon determining that the photographic device is a legitimate device, the authentication processor may control the photographic device so as to embed the individual identification information obtained from the unmanned aerial vehicle via the communicator into the video data acquired by the photographic device.

According to this configuration, the individual identification information with which the unmanned aerial vehicle can be uniquely identified needs to be embedded into the video data in order to perform aerial photography successfully. In addition, since the information that leads to identifying the photographing person is included in the video data, it is possible to check executing dangerous or illegitimate aerial photography, and it is possible to further check posting video or the like acquired thereby on the Internet.

The aerial photography requirement may be to recognize, in video data acquired by the photographic device, a specific image region that satisfies a predetermined condition and to perform image processing for making perception of the specific image region difficult; and upon determining that the photographic device is a legitimate device, the authentication processor may control the photographic device so as to recognize the specific image region and so as to perform image processing for making perception of the specific image region difficult.

According to this configuration, an image acquired by the unmanned aerial vehicle is an image processed so that it is difficult to perceive the specific image region, that is, a region that can violate privacy, thus realizing privacy protection during aerial photography.

In addition, not only can the present disclosure be realized as an unmanned aerial vehicle having the above-described characteristic configuration, but also the present disclosure can be realized as a control method for an unmanned aerial vehicle that executes characteristic processing corresponding to the characteristic configuration of the unmanned aerial vehicle. Accordingly, another aspect described below can also offer advantages that are substantially the same as those of the above-described unmanned aerial vehicle.

A control method for an unmanned aerial vehicle according to another aspect of the present disclosure is directed to a control method for an unmanned aerial vehicle that has a mounting portion to which a photographic device is mounted and that performs flight based on a remote operation from a control unit or performs autonomous flight. The control method includes: performing authentication on the photographic device by using a communicator that performs communication with the photographic device and determining whether or not the photographic device is a legitimate device that satisfies a predetermined aerial photography requirement; and performing operation limitation on a predetermined function of the unmanned aerial vehicle so that the photographic device is incapable of performing aerial photography, upon determining that the photographic device is not a legitimate device.

Embodiments of the present disclosure will be described below in detail with reference to the accompanying drawings. The embodiments described below each represent a specific example of the present disclosure. Shapes, constituent elements, steps, the order of steps, and so on described in the embodiments below are examples, and are not intended to limit the present disclosure.

Of the constituent elements in the embodiments described below, the constituent elements not set forth in the independent claims that represent the broadest concept will be described as optional constituent elements. In all of the embodiments, the details thereof can also be combined. In addition, the present disclosure encompasses various modifications obtained by making changes conceived by those skilled in the art to each embodiment of the present disclosure, as long as such modifications do not depart from the spirit and scope of the present disclosure.

First Embodiment

FIG. 1 is an external view illustrating one example of an unmanned aerial vehicle having a mounting portion for a photographic device in a first embodiment of the present disclosure. An unmanned aerial vehicle 101 illustrated in FIG. 1 has a photographic-device mounting portion 102, a main portion 103, four supporting portions 104, and four propellers 105. The photographic-device mounting portion 102 is a mounting portion for a photographic device 201 indicated by a dashed line and is electrically connected to the main portion 103 of the unmanned aerial vehicle 101 through a power supply line and a control signal line. The propellers 105 are attached to leading ends of the supporting portions 104, which extend from the main portion 103 in four directions, and generate propulsive force of the unmanned aerial vehicle 101. The configuration of the unmanned aerial vehicle 101 is not limited to the above-described example, and various changes, such as changing the number of supporting portions 104 and the number of propellers 105, may be made thereto.

Figure 2:
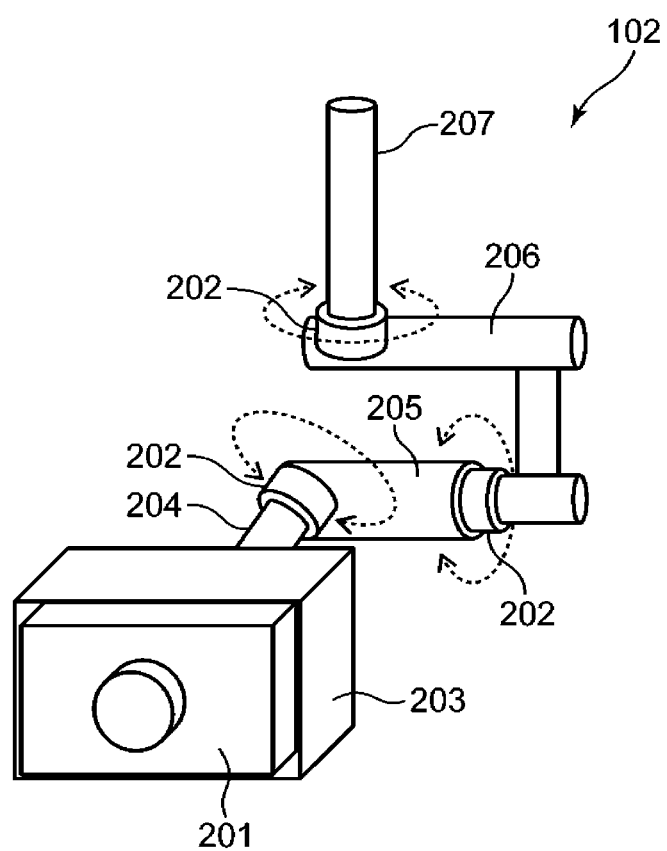
FIG. 2 is an external view illustrating one example of a photographic-device mounting portion illustrated in FIG. 1.

FIG. 2 is an external view illustrating one example of a state in which the photographic device 201 is mounted to the photographic-device mounting portion 102 illustrated in FIG. 1. The photographic-device mounting portion 102 includes three servo motors 202, a fixing frame 203, and arm portions 204 to 207.

The photographic device 201 is fixed to the fixing frame 203, and one end of the arm portion 207 is fixed to the main portion 103. The fixing frame 203 is connected to one end of the arm portion 204, another end of the arm portion 204 is connected to one end of the arm portion 205 in a state in which the arm portion 204 is rotatable in the rotation direction indicated by a dashed line in FIG. 2, another end of the arm portion 205 is connected to one end of the arm portion 206 in a state in which the arm portion 205 is rotatable in the rotation direction indicated by a dashed line in FIG. 2, and another end of the arm portion 206 is connected to another end of the arm portion 207 in a state in which the arm portion 206 is rotatable in the rotation direction indicated a dashed line in FIG. 2.

The servo motors 202 are attached to the arm portions 204, 205, and 207, and rotation operations of the servo motors 202 are controlled based on control signals from the main portion 103 of the unmanned aerial vehicle 101. With the above-described configuration, the orientation of the photographic device 201 can be controlled using three axes, that is, vertical, longitudinal, and lateral axes of the photographic device 201, as rotation axes.

Figure 3:
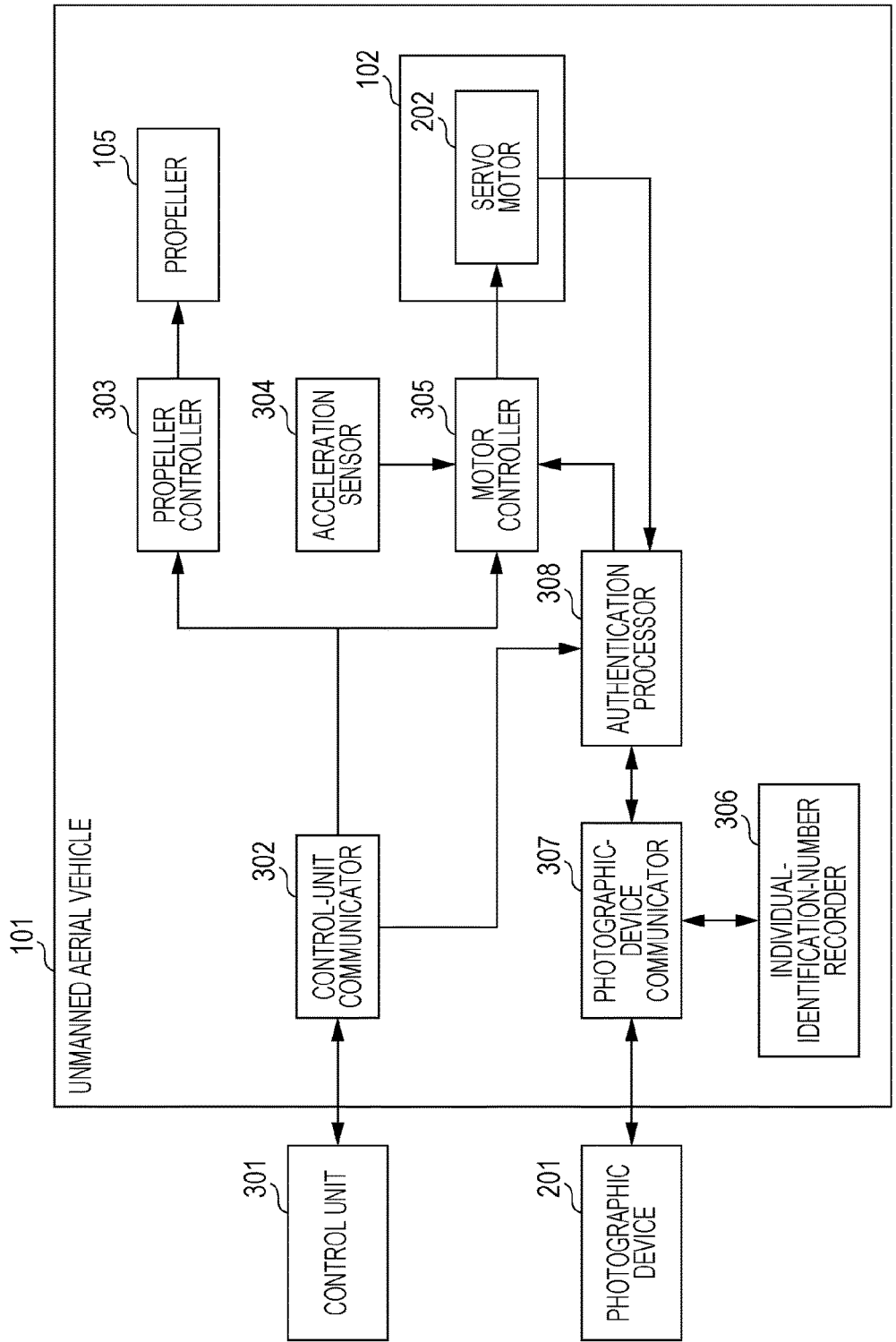
FIG. 3 is a block diagram illustrating one example of the configuration of the unmanned aerial vehicle illustrated in FIG. 1.

FIG. 3 is a block diagram illustrating one example of the configuration of the unmanned aerial vehicle 101 illustrated in FIG. 1. Although the unmanned aerial vehicle 101 uses the four propellers 105 and the three servo motors 202, they are each illustrated as one block in FIG. 3 for simplicity of illustration, and the same applies to FIG. 9.

As illustrated in FIG. 3, in addition to the propellers 105 illustrated in FIG. 1, the servo motors 202 illustrated in FIG. 2, and so on, the unmanned aerial vehicle 101 has a control-unit communicator 302, a propeller controller 303, an acceleration sensor 304, a motor controller 305, an individual-identification-number recorder 306, a photographic-device communicator 307, and an authentication processor 308. For example, the control-unit communicator 302, the propeller controller 303, the acceleration sensor 304, the motor controller 305, the individual-identification-number recorder 306, and the authentication processor 308 are provided in the main portion 103 illustrated in FIG. 1, and the photographic-device communicator 307 is provided on the fixing frame 203 illustrated in FIG. 2.

A user uses a control unit 301 in order to remotely control the unmanned aerial vehicle 101, and the unmanned aerial vehicle 101 performs flight based on remote operations performed by the control unit 301 or performs autonomous flight.

The control-unit communicator 302 is wirelessly connected to the control unit 301 and receives an operation instruction from the control unit 301. The control-unit communicator 302 inputs a control instruction, transmitted from the control unit 301, to the propeller controller 303. In accordance with the input operation instruction, the propeller controller 303 changes the rotation speed of the propeller 105 and so on to thereby realize flight, involving ascending, descending, moving, and so on, according to the control instruction.

The control-unit communicator 302 also inputs the control instruction, output from the control unit 301, to the motor controller 305. The motor controller 305 is connected to the servo motors 202 of the photographic-device mounting portion 102. On the basis of the operation instruction input from the control-unit communicator 302, the motor controller 305 actuates the servo motors 202 of the photographic-device mounting portion 102 to thereby make it possible to change a photography direction to a direction indicated by an operator. That is, the photographic-device mounting portion 102 has an electronically controllable camera-platform function for changing the photography direction of the photographic device 201 through a remote operation.

The motor controller 305 is also connected to the acceleration sensor 304. On the basis of sensor information obtained from the acceleration sensor 304, the motor controller 305 causes the servo motors 202 of the photographic-device mounting portion 102 to change in a direction in which generated acceleration of the unmanned aerial vehicle 101 is cancelled. By doing so, the motor controller 305 suppresses motion blur during moving-image photography. That is, the photographic-device mounting portion 102 also has an electronically controllable stabilizer function for reducing motion blur in moving images during photography performed by the photographic device 201.

The configuration of the photographic-device mounting portion 102 is not particularly limited to the above-described example, and various changes can be made, as long as the photographic-device mounting portion 102 can function as an electronically controllable camera platform (a changing portion that changes the photography direction of the photographic device 201 through a remote operation from the control unit 301) and/or an electronically controllable stabilizer (a stabilizing portion that reduces motion blur in moving images during aerial photography performed by the photographic device 201).

The photographic-device communicator 307 communicates with the photographic device 201 mounted to the photographic-device mounting portion 102. The photographic-device communicator 307 uses, for example, Bluetooth®, which is a short-range wireless communication standard, as a communication method.

The authentication processor 308 performs authentication on the photographic device 201 by using the photographic-device communicator 307 to determine whether or not the photographic device 201 is a legitimate device that satisfies a predetermined aerial photography requirement. Herein, the aerial photography requirement is a condition that defines operations that are to be executed during aerial photography performed by the photographic device 201 in order to ensure traceability of video data. For example, the aerial photography requirement is embedding, into video data acquired by the photographic device 201, photography condition information for tracking history of video data acquired by the photographic device 201.

The aerial photography requirement is not particularly limited to this example, and various changes can be made thereto. For example, the photography condition information may be embedded into video data, acquired by the photographic device 201, through use of digital watermarking, or individual identification information with which the unmanned aerial vehicle 101 can be uniquely identified may be used as the photography condition information.

Specifically, the authentication processor 308 establishes a logical communication path (session) with the photographic device 201 via the photographic-device communicator 307. In addition, by using the session, the authentication processor 308 executes a predetermined protocol to attempt to authenticate the photographic device 201. When the authentication fails, the authentication processor 308 disables the function of the motor controller 305. When the authentication succeeds, the authentication processor 308 maintains the session. If a physical communication or the session is disconnected for some reason, the authentication processor 308 disables the function of the motor controller 305.

An individual identification number, which is individual identification information with which the unmanned aerial vehicle 101 can be uniquely identified, is recorded in the individual-identification-number recorder 306. In response to an individual-identification-number obtain request from the photographic device 201 via the photographic-device communicator 307, the individual-identification-number recorder 306 can transmit the individual identification number to the photographic device 201 via the photographic-device communicator 307.

Figure 4:
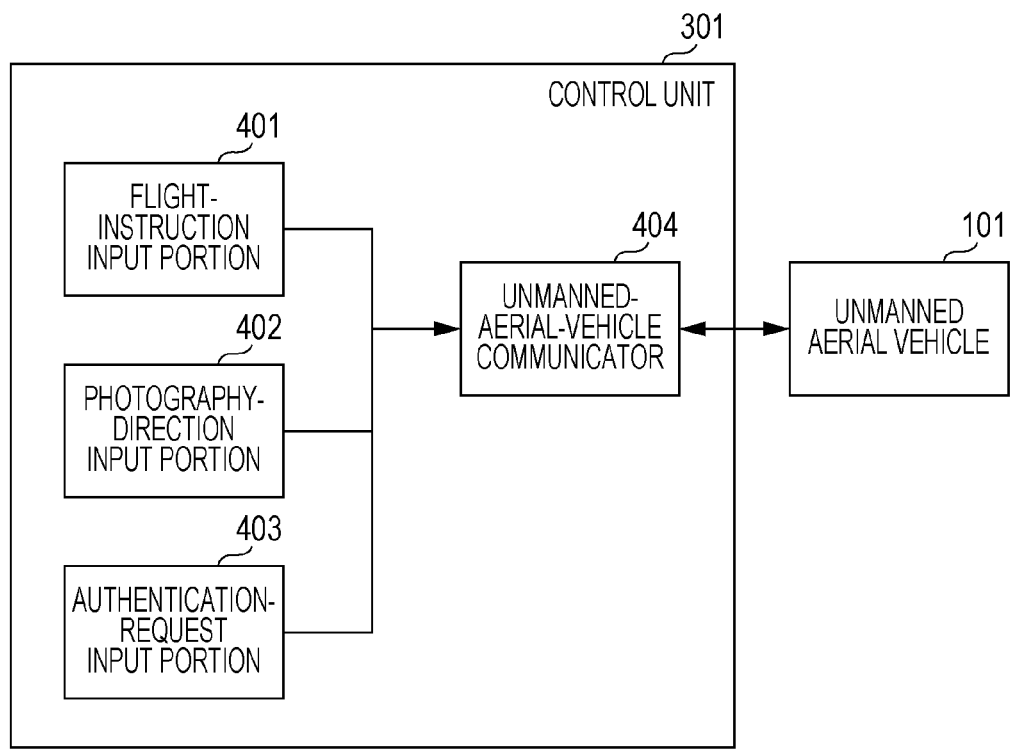
FIG. 4 is a block diagram illustrating one example of the configuration of a control unit illustrated in FIG. 3.

FIG. 4 is a block diagram illustrating one example of the configuration of the control unit 301 illustrated in FIG. 3. The control unit 301 illustrated in FIG. 4 includes a flight-instruction input portion 401, a photography-direction input portion 402, an authentication-request input portion 403, and an unmanned-aerial-vehicle communicator 404.

The flight-instruction input portion 401 is operated by the user and inputs a flight instruction for ascending, descending, and moving, and so on. The photography-direction input portion 402 is operated by the user and inputs an instruction for changing the photography direction of the photographic device 201 mounted to the photographic-device mounting portion 102. The authentication-request input portion 403 inputs an instruction for starting authentication processing for the unmanned aerial vehicle 101. The unmanned-aerial-vehicle communicator 404 transmits the instructions, input by the flight-instruction input portion 401, the photography-direction input portion 402, and the authentication-request input portion 403, to the unmanned aerial vehicle 101 through wireless communication.

(Details of Method for Communication Between Unmanned Aerial Vehicle 101 and Photographic Device 201)

A method for communication between the photographic-device communicator 307 in the unmanned aerial vehicle 101 and the unmanned-aerial-vehicle communicator 404 in the photographic device 201 may be a wired communication through an electrical connection or may be a wireless communication other than a Bluetooth® communication. However, when the wireless communication is used, it is necessary to give consideration to "impersonation" of the photographic device 201.

The "impersonation" as used herein refers to an action of performing authentication through communication between a legitimate photographic device that can be authenticated and the unmanned aerial vehicle 101 to thereby release the function limitation and then mounting an illegitimate photographic device that cannot be authenticated to the photographic-device mounting portion 102 or an action that causes the unmanned aerial vehicle 101 to erroneously recognize an illegitimate photographic device as a legitimate photographic device by performing an action that is similar to that action.

In order to prevent impersonation, it is desirable that, when a wireless communication is used, a communication standard predicated on a sufficiently short transmission distance be used or the radio propagation distance of the photographic-device communicator 307 be limited to a sufficiently short distance. Thus, when the distance between a legitimate photographic device used for "impersonation" and the photographic-device mounting portion 102 is sufficiently large (e.g., when a legitimate photographic device is removed from the photographic-device mounting portion 102, or when the unmanned aerial vehicle 101 enters a flight state while a legitimate photographic device is left on the ground), the communication connection between the photographic device and the unmanned aerial vehicle 101 is broken, and thus connection check processing described below fails. Examples of the communication standard predicated on a short transmission distance include near field communication (NFC) and TransferJet®.

(Details of Photographic Device that can be Authenticated by Unmanned Aerial Vehicle 101)

Figure 5:
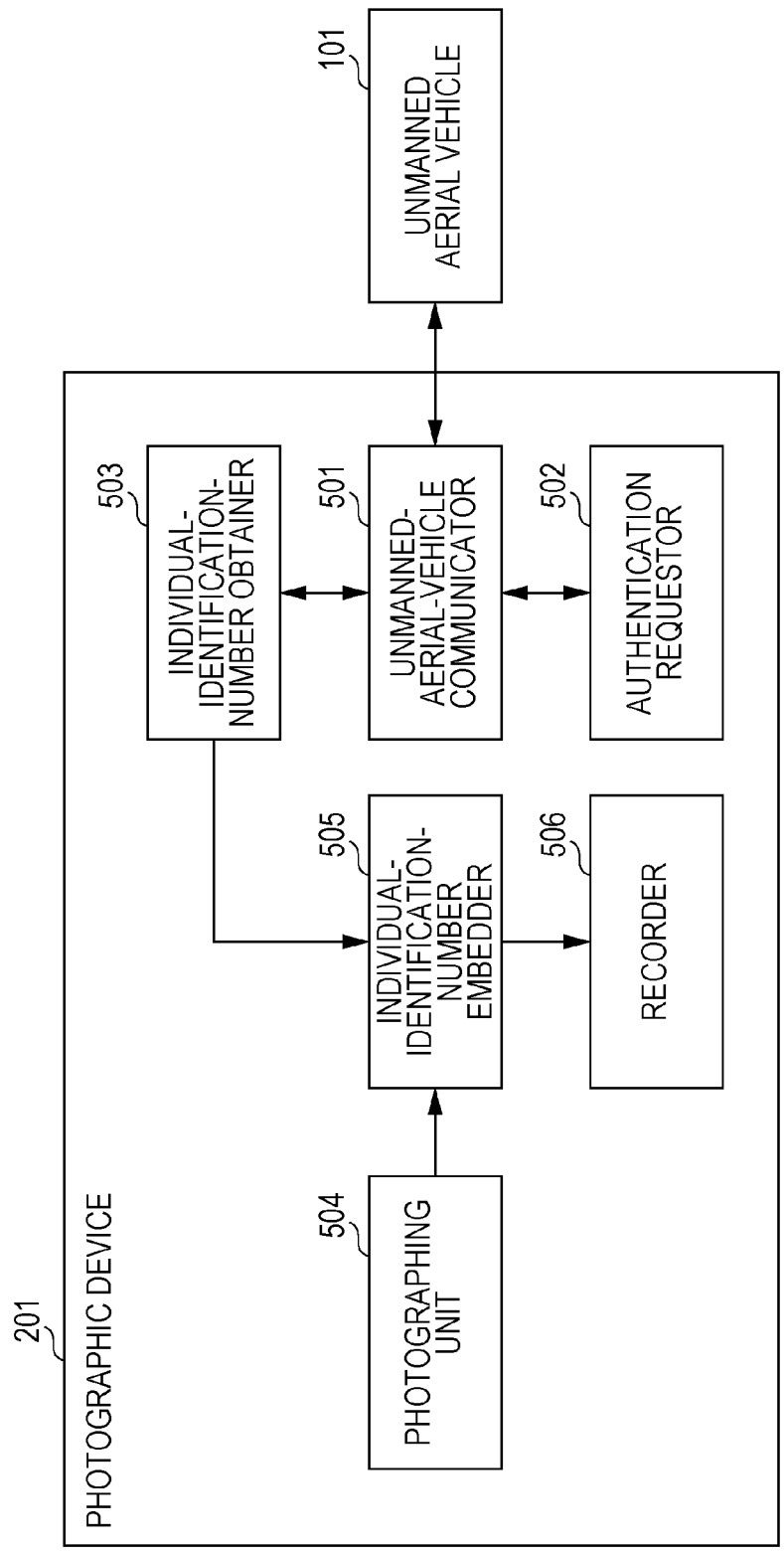
FIG. 5 is a block diagram illustrating one example of the configuration of a photographic device illustrated in FIG. 3 when the photographic device is a legitimate photographic device.

FIG. 5 is a block diagram illustrating one example of the configuration of the photographic device 201 illustrated in FIG. 3 when the photographic device 201 is a legitimate photographic device. When the photographic device 201 is a legitimate photographic device, the photographic device 201 includes an unmanned-aerial-vehicle communicator 501, an authentication requestor 502, an individual-identification-number obtainer 503, a photographing unit 504, an individual-identification-number embedder 505, and a recorder 506, as illustrated in FIG. 5.

The unmanned-aerial-vehicle communicator 501 establishes a physical connection with the photographic-device communicator 307 to communicate with the unmanned aerial vehicle 101. The authentication requestor 502 establishes a session with the authentication processor 308 via the unmanned-aerial-vehicle communicator 501 to authenticate the photographic device 201 in accordance with a predetermined protocol.

The individual-identification-number obtainer 503 establishes a session with the individual-identification-number recorder 306 via the unmanned-aerial-vehicle communicator 501 to obtain the individual identification number of the unmanned aerial vehicle 101. The photographing unit 504 includes a lens, an image sensor, and so on. The photographing unit 504 obtains acquired video data and outputs the video data. The individual-identification-number embedder 505 performs processing for embedding, into the video data input from the photographing unit 504, the individual identification number of the unmanned aerial vehicle 101 which is input from the individual-identification-number obtainer 503. The video data in which the individual identification number is embedded is output from the individual-identification-number embedder 505 to the recorder 506 and is record thereto.

The individual-identification-number embedder 505 uses, for example, imperceptible electronic watermarking as a method for embedding the individual identification number into the video data. In this case, it is possible to embed the individual identification number into the video data, while suppressing deterioration of a visual image quality of the video data.

In the present embodiment, the unmanned aerial vehicle 101 treats only the photographic device 201 having the above-described configuration as a legitimate photographic device and can authenticate the photographic device 201, and the photographic device 201 can perform aerial photography to acquire video data in which the individual identification number of the unmanned aerial vehicle 101 is embedded.

The information embedded into the video data and the method for embedding the information are not particularly limited to the above-described examples, and various changes can be made. For example, photography conditions, such as a photography location and the photography date and time, in addition to the individual identification number of the unmanned aerial vehicle, may be included as the information embedded into the video data. Also, when information with which a photographing person who is the user of the photographic device 201 can be uniquely identified can be obtained using some method, this information may be embedded, and a method for superimposing an image resulting from conversion of the embedded information onto the video data may be used as the method for the embedment.

(Details of Authentication Processing)

Figure 6:
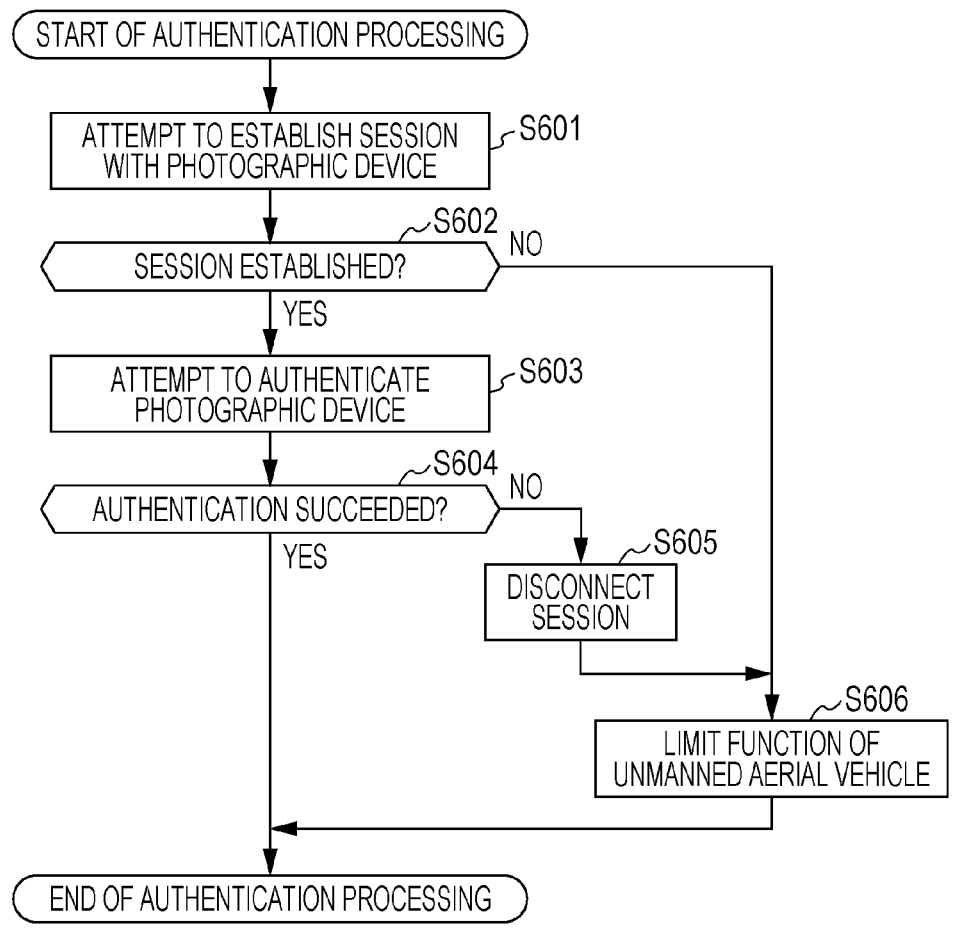
FIG. 6 is a flowchart illustrating one example of a flow of authentication processing performed by the unmanned aerial vehicle illustrated in FIG. 3.

FIG. 6 is a flowchart illustrating one example of a flow of authentication processing performed by the unmanned aerial vehicle 101 illustrated in FIG. 3. This processing is started by performing a predetermined input using the control unit 301 when the power of the unmanned aerial vehicle 101 is turned on or when the unmanned aerial vehicle 101 is stationary.

First, the authentication processor 308 attempts to establish a session with the authentication requestor 502 (step S601). Next, the authentication processor 308 determines whether or not the session with the authentication requestor 502 is established (step S602).

If the session establishment succeeds (YES in step S602), the authentication processor 308 communicates with the authentication requestor 502 in accordance with a predetermined protocol to attempt to authenticate the photographic device 201 (step S603). Next, the authentication processor 308 determines whether or not the authentication of the photographic device 201 has succeeded (step S604). If the authentication has succeeded (YES in step S604), the authentication processor 308 ends the authentication processing.

On the other hand, if the authentication fails (NO in step S604), the authentication processor 308 disconnects the session (step S605).

Also, if the session establishment fails (NO in step S602), or the authentication fails and the session is disconnected (step S605), the authentication processor 308 limits the function of the unmanned aerial vehicle 101, that is, disables the function of the motor controller 305 (step S606), and ends the authentication processing.

The authentication of the photographic device 201 in step S603 is realized by a procedure that is the same as or similar to that of first device authentication in a High-bandwidth Digital Content Protection (HDCP) standard. In this device authentication, each of the photographic device 201 and the unmanned aerial vehicle 101 needs to hold an independent private key and a public key.

The private key and the public key are stored in predetermined tamper-proof areas (i.e., areas in which illegitimate internal analysis and modification of software, the hardware circuits, and so on are prevented) in the photographic device 201 and the unmanned aerial vehicle 101 during manufacture or before shipment of the photographic device 201 and the unmanned aerial vehicle 101. Examples of the tamper-proof areas include areas provided in the individual-identification-number recorder 306 and the recorder 506. The private key and the public key for successful authentication need to be keys that have been generated according to a legitimate algorithm. The legitimate private key and the public key are issued through a predetermined procedure and evaluation, and only when the evaluation confirms that the photographic device 201 has specifications that satisfy predetermined requirements, the photographic device 201 can receive the legitimate keys that are issued. Since the authentication procedure in the HDCP standard has been known, a description thereof is not given hereinafter.

The method for the device authentication is not limited to the above-described method using the HDCP standard. One possible method for the device authentication is a method in which the scheme of client authentication in Security Sockets Layer (SSL) is used to verify whether or not a digital certificate stored in the tamper-proof area in the photographic device 201 is a certificate issued through a legitimate procedure.

Figure 7:
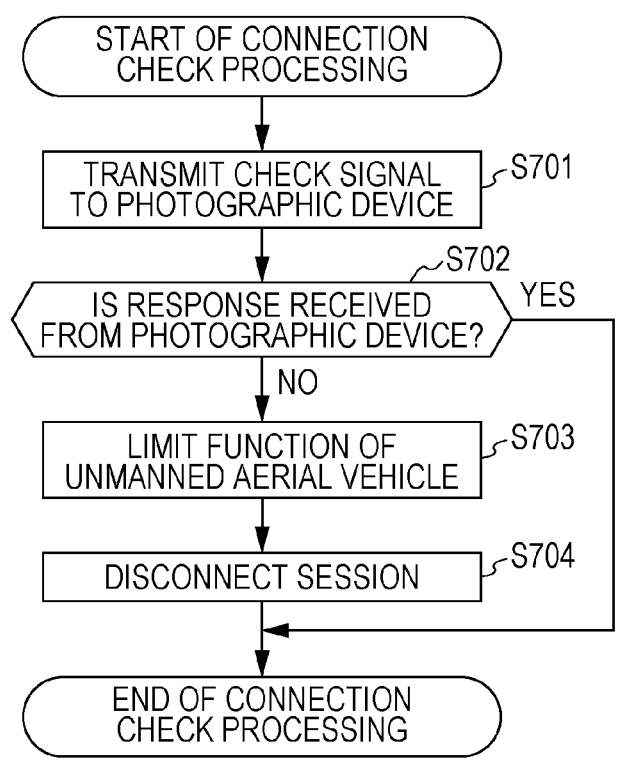
FIG. 7 is a flowchart illustrating one example of a flow of connection check processing performed by the unmanned aerial vehicle illustrated in FIG. 3.

FIG. 7 is a flowchart illustrating one example of a flow of connection check processing performed by the unmanned aerial vehicle 101 illustrated in FIG. 3. The authentication processor 308 periodically performs the connection check processing in order to check whether no impersonation of the photographic device 201 is performed.

First, the authentication processor 308 transmits a check signal to the authentication requestor 502 in the photographic device 201 (step S701). Next, the authentication processor 308 determines whether or not a response to the check signal is received from the photographic device 201 (step S702).

If a response to the check signal is not received from the photographic device 201 (NO in step S702), the authentication processor 308 enables the function limitation of the unmanned aerial vehicle 101 (step S703), disconnects a session with the photographic device 201 (step S704), and then ends the connection check processing. On the other hand, if a response to the check signal is received from the photographic device 201 (YES in step S702), the authentication processor 308 ends the connection check processing.

(Details of Disabling Function of Motor Controller 305)

When the unmanned aerial vehicle 101 fails in the authentication of the photographic device 201 during the above-described authentication processing or the session is disconnected for some reason during the above-described connection check processing after the authentication (i.e., when the photographic device 201 is not a legitimate device), the authentication processor 308 disables some of the functions of the motor controller 305, which is one example of the changing portion that changes the photography direction of the photographic device 201 through a remote operation from the control unit 301, thereby disabling the camera-platform electronic control function of the photographic-device mounting portion 102 to limit the change of the photography direction of the photographic device 201. As a result, a photography-direction change instruction that the photographing person has input to the control unit 301 is disabled, thereby making it difficult for the photographing person to acquire desired video.

Not only is the instruction for changing the photography direction disabled, but also the authentication processor 308 can fix the photography direction of the photographic device 201 to a predetermined position so that the photographic device 201 cannot perform aerial photography by inputting a photography direction instruction to the motor controller 305. In particular, when the photography direction is directed to the bottom surface of the unmanned aerial vehicle 101 and is fixed thereto, only video of the bottom surface of the unmanned aerial vehicle 101 is acquired, and thus the video becomes visually meaningless.

In addition, as a modification of disabling the function of the motor controller 305, the motor controller 305 can also disable the stabilizer function. In this case, the electronic stabilizer function of the motor controller 305, which is one example of a stabilizing portion for reducing motion blur in a moving image during aerial photography performed by the photographic device 201, is disabled, and a moving image acquired when the electronic stabilizer function is disabled includes a large amount of motion blur, and thus becomes visually meaningless.

As described above, when at least one of the electronic control function and the electronic stabilizer function of the photographic-device mounting portion 102 included in the camera platform is disabled, it is possible to substantially limit the aerial photography using the photographic device 201 that cannot be authenticated by the unmanned aerial vehicle 101.

(Advantages)

As described above, the unmanned aerial vehicle 101 can permit aerial photography to be performed by only a photographic device authenticated to be a legitimate device, for example, the photographic device 201 (illustrated in FIG. 5) having a function for embedding, as a digital watermark, the individual identification number of the unmanned aerial vehicle into acquired video. On the other hand, with respect to a photographic device that does not have the above-described function and is not a legitimate device, the unmanned aerial vehicle 101 does not authenticate the photographic device and can substantially limit aerial photography by limiting both or one of the camera-platform electronic control function and the electronic stabilizer function of the photographic-device mounting portion 102.

Also, when the photographic device mounted to the unmanned aerial vehicle 101 is a legitimate device, and the photographic device is used to perform aerial photography, the individual identification number with which the unmanned aerial vehicle 101 can be uniquely identified is embedded into the video data. That is, since video acquired by aerial photography includes information that leads to identifying a photographing person, it is possible to suppress executing inappropriate aerial photography and posting video or the like acquired by the aerial photography.

Second Embodiment

Figure 8:
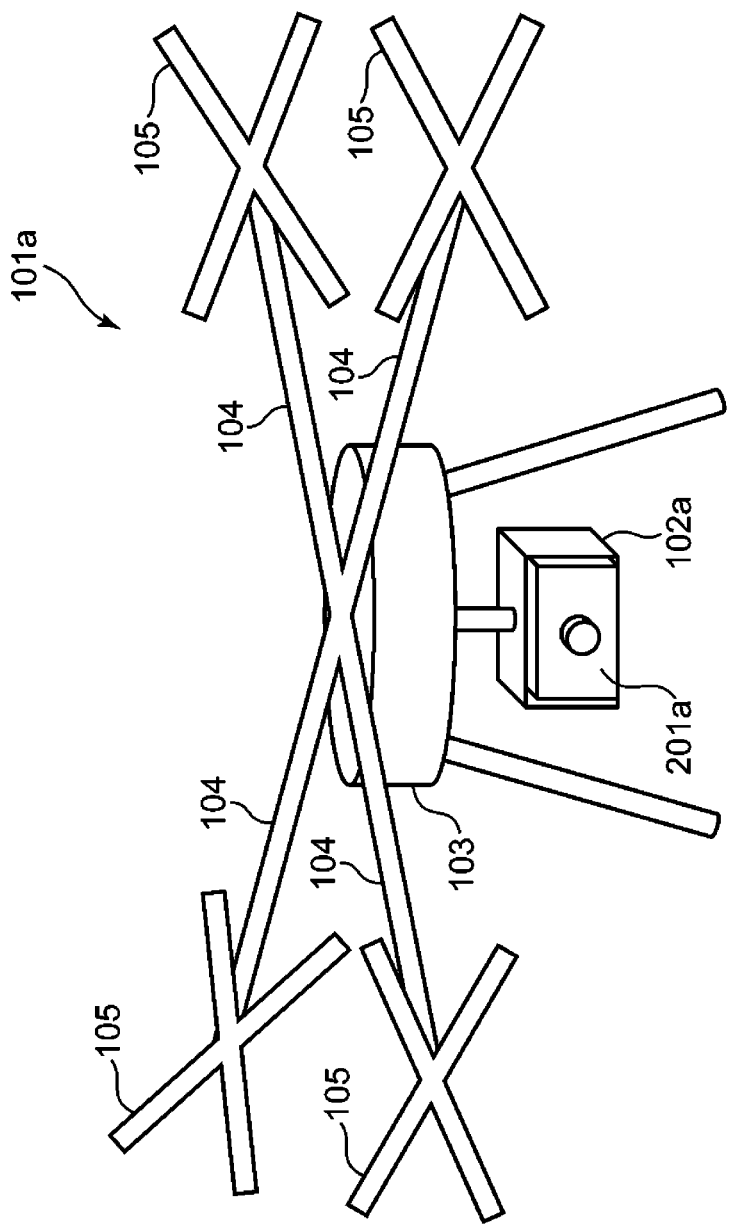
FIG. 8 is an external view illustrating one example of an unmanned aerial vehicle according to a second embodiment of the present disclosure.

FIG. 8 is an external view illustrating one example of an unmanned aerial vehicle having a mounting portion for a photographic device in a second embodiment of the present disclosure. An unmanned aerial vehicle 101a illustrated in FIG. 8 has a photographic-device mounting portion 102a, a main portion 103, four supporting portions 104, and four propellers 105. In FIG. 8, constituent elements that are the same as or similar to those in FIG. 1 are denoted by the same reference numerals, and descriptions thereof are not given hereinafter.

The photographic-device mounting portion 102a has a configuration that is different from that of the photographic-device mounting portion 102 in the first embodiment. That is, the photographic-device mounting portion 102a is fixed to the main portion 103, does not have the servo motors 202 and so on, and does not have a camera platform function and a stabilizer function.

Figure 9:
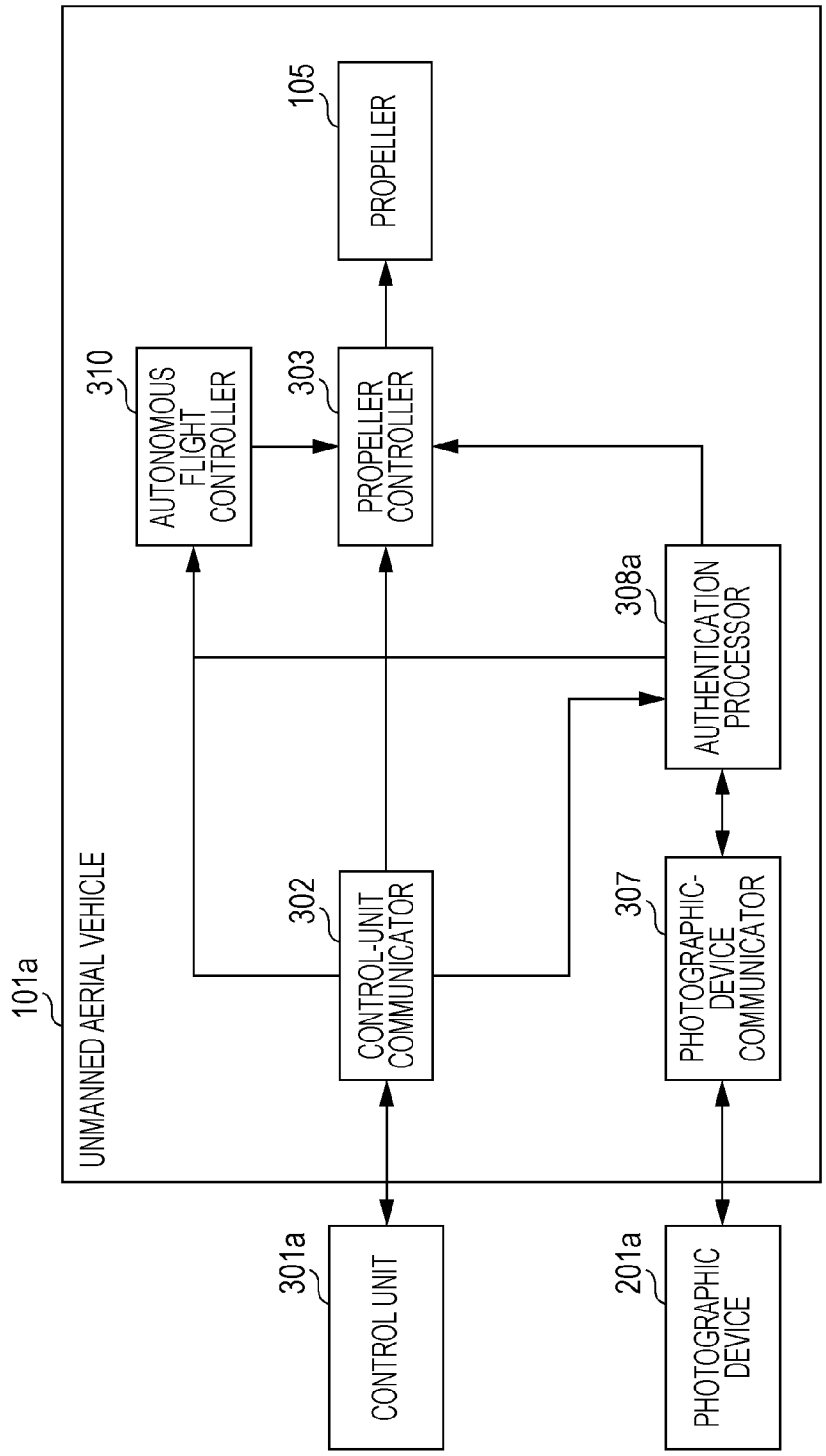
FIG. 9 is a block diagram illustrating one example of the configuration of the unmanned aerial vehicle illustrated in FIG. 8.

FIG. 9 is a block diagram illustrating one example of the configuration of the unmanned aerial vehicle 101a illustrated in FIG. 8. As illustrated in FIG. 9, in addition to the propellers 105 and so on illustrated in FIG. 8, the unmanned aerial vehicle 101a has a control-unit communicator 302, a propeller controller 303, a photographic-device communicator 307, an authentication processor 308a, and an autonomous flight controller 310. In FIG. 9, constituent elements that are the same as or similar to those in FIG. 3 are denoted by the same reference numerals, and descriptions thereof are not given hereinafter.

The autonomous flight controller 310 realizes autonomous flight of the unmanned aerial vehicle 101a by controlling the propeller controller 303. The autonomous flight of the unmanned aerial vehicle 101a is performed based on an autonomous flight program stored in the autonomous flight controller 310. Examples of the autonomous flight program include a program for flying the unmanned aerial vehicle 101a in accordance with a pre-set flight plan, a program for performing a landing operation while the unmanned aerial vehicle 101a is maintained in a horizontal position, and a program for automatically returning the unmanned aerial vehicle 101a to a position where it took off. Since the autonomous flight of the unmanned aerial vehicle is a known technique, a description thereof is not given herein. Switching from a manual flight state, which uses a control unit 301a, to an autonomous flight state is performed upon an instruction from the control unit 301a via the control-unit communicator 302.

In the present embodiment, the authentication processor 308a is connected to the propeller controller 303. By using the photographic-device communicator 307, the authentication processor 308a performs authentication on a photographic device 201a to determine whether or not the photographic device 201a is a legitimate device that satisfies a predetermined aerial photography requirement. The "aerial photography requirement" in this case is a condition that defines an operation that the photographic device 201a is to execute during aerial photography in order to realize privacy protection for video data. For example, the aerial photography requirement is to recognize, in video data acquired by the photographic device 201a, a specific image region that satisfies a predetermined condition and to perform image processing for making perception of the specific image region difficult. The aerial photography requirement is not particularly limited to this example, and various changes can be made.

Upon failing in the authentication processing on the photographic device 201a, the authentication processor 308a controls the propeller controller 303 so that it does not receive an operation instruction from the control unit 301a. The authentication processing performed by the authentication processor 308a is started when the power of the unmanned aerial vehicle 101a is turned on, as in the first embodiment. Alternatively, the authentication processing is started by performing a predetermined input using the control unit 301a when the unmanned aerial vehicle 101a is stationary. Thus, unless the unmanned aerial vehicle 101a authenticates the photographic device 201a, the unmanned aerial vehicle 101a does receive an operation using the control unit 301a and thus cannot enter a flight state.

The authentication processor 308a is also connected to the autonomous flight controller 310. Thus, in response to an instruction from the authentication processor 308a, the unmanned aerial vehicle 101a can also enter an autonomous flight state.

Figure 10:
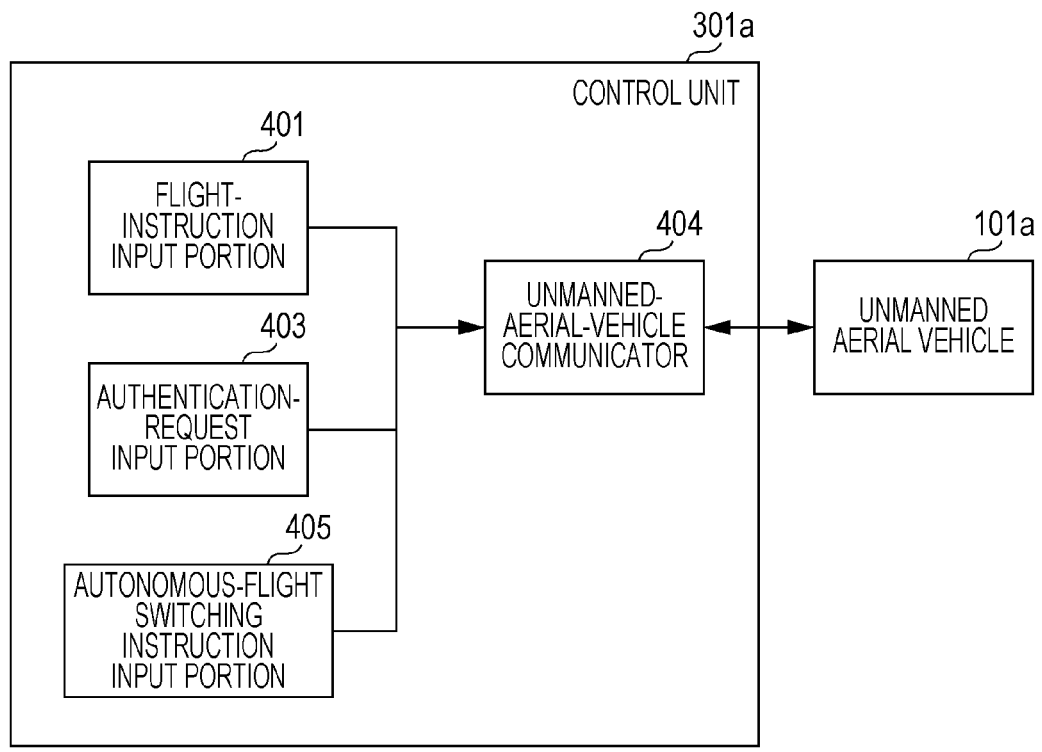
FIG. 10 is a block diagram illustrating one example of the configuration of a control unit illustrated in FIG. 9.

FIG. 10 is a block diagram illustrating one example of the configuration of the control unit 301a illustrated in FIG. 9. As illustrated in FIG. 10, the control unit 301a includes a flight-instruction input portion 401, an authentication-request input portion 403, an unmanned-aerial-vehicle communicator 404, and an autonomous-flight switching instruction input portion 405. In FIG. 10, constituent elements that are the same as or similar to those in FIG. 4 are denoted by the same reference numerals, and descriptions thereof are not given hereinafter.

The autonomous-flight switching instruction input portion 405 is operated by the user and inputs an instruction for selecting an autonomous flight program, an instruction for switching from the manual flight state to the autonomous flight state, and an instruction for switching from the autonomous flight state to the manual flight state. However, when the authentication processor 308a changes the flight state of the unmanned aerial vehicle 101a from the manual flight state to the autonomous flight state, the autonomous flight state cannot be changed to the manual flight state even when an input is performed to the autonomous-flight switching instruction input portion 405.

(Details of Photographic Device that can be Authenticated by Unmanned Aerial Vehicle 101a)

Figure 11:
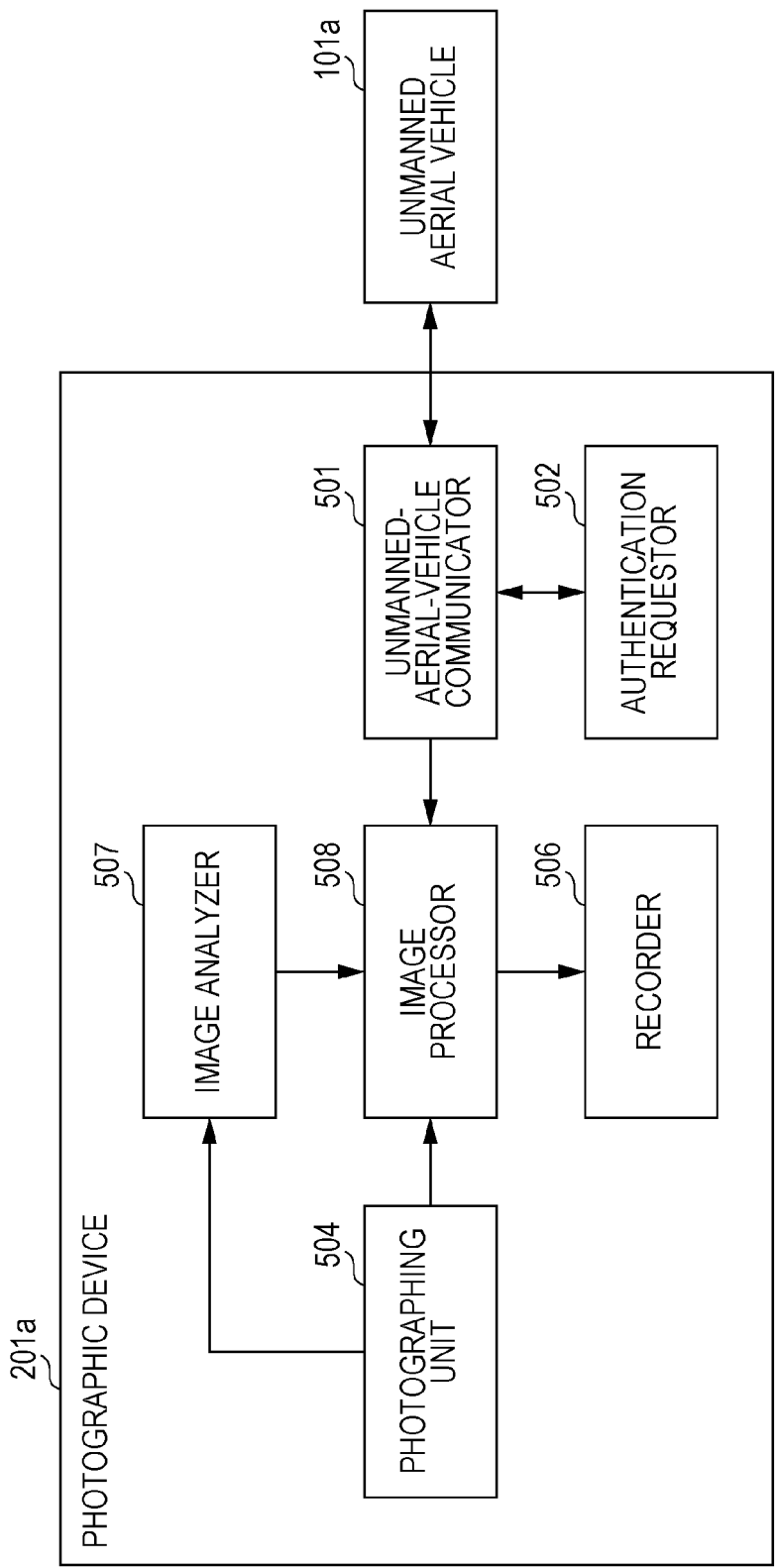
FIG. 11 is a block diagram illustrating one example of the configuration of a photographic device illustrated in FIG. 9 when the photographic device is a legitimate photographic device.

FIG. 11 is a block diagram illustrating one example of the configuration of the photographic device 201a illustrated in FIG. 9 when the photographic device 201a is a legitimate photographic device. When the photographic device 201a is a legitimate photographic device, the photographic device 201a includes an unmanned-aerial-vehicle communicator 501, an authentication requestor 502, a photographing unit 504, a recorder 506, an image analyzer 507, and an image processor 508, as illustrated in FIG. 11. In FIG. 11, constituent elements that are the same as or similar to those in FIG. 5 are denoted by the same reference numerals, and descriptions thereof are not given hereinafter.

Upon determining that the photographic device 201a is a legitimate device, the authentication processor 308a recognizes a specific image region that satisfies a predetermined condition and controls the image analyzer 507 and the image processor 508 so as to perform image processing for making perception of the specific image region difficult, in order to protect privacy during aerial photography.

Specifically, the image analyzer 507 performs facial recognition processing on video data acquired by the photographing unit 504 and determines whether or not the video data includes a face image. Since this face-image recognition processing is a known technique, a description thereof is not given herein.

When it is determined that a face image exists in the video data, the image analyzer 507 outputs rectangular coordinate information indicating the position of the face image. When a plurality of face images exists, the image analyzer 507 outputs a set of pieces of coordinate information, the number of which is equal to the number of recognized face images. The image processor 508 performs blurring processing on a face image region indicated by the coordinate information output by the image analyzer 507.

In the present embodiment, the unmanned aerial vehicle 101a treats only the photographic device 201a having the above-described configuration as a legitimate photographic device and can authenticate the photographic device 201a, and the photographic device 201a can perform aerial photography to acquire video data in which blurring processing is performed on a face image region and in which it is difficult to perceive the face image region.

The image recognized by the image analyzer 507 is not limited to face images, and the image analyzer 507 may be configured so as to recognize images of car license plates, residences, and so on that can violate privacy. Herein, such image regions that can violate privacy are referred to as specific image regions. The shape of each specific image region is not limited to a rectangle and may be any shape. The image processing performed by the image processor 508 is not limited to the blurring processing and may be any processing that can make perception of the specific image region difficult. For example, the image processing may be processing for coloring the specific image region in black.

Next, a description will be given of authentication processing performed by the authentication processor 308a in the present embodiment. Since the authentication processing performed by the authentication processor 308a is basically the same as the authentication processing performed by the authentication processor 308 illustrated in FIG. 6, illustration and a detailed description of the same or similar processing are not given hereinafter. That is, the authentication processing performed by the authentication processor 308a is the same as the authentication processor 308 illustrated in FIG. 6, except for step S606. That is, in step S606, the authentication processor 308a disables the function of the propeller controller 303, the disabling being limitation of the function of the unmanned aerial vehicle 101a, so as not to receive an operation instruction from the control unit 301a and causes the flight of the unmanned aerial vehicle 101a to change to an autonomous flight using the autonomous flight controller 310.

Figure 12:
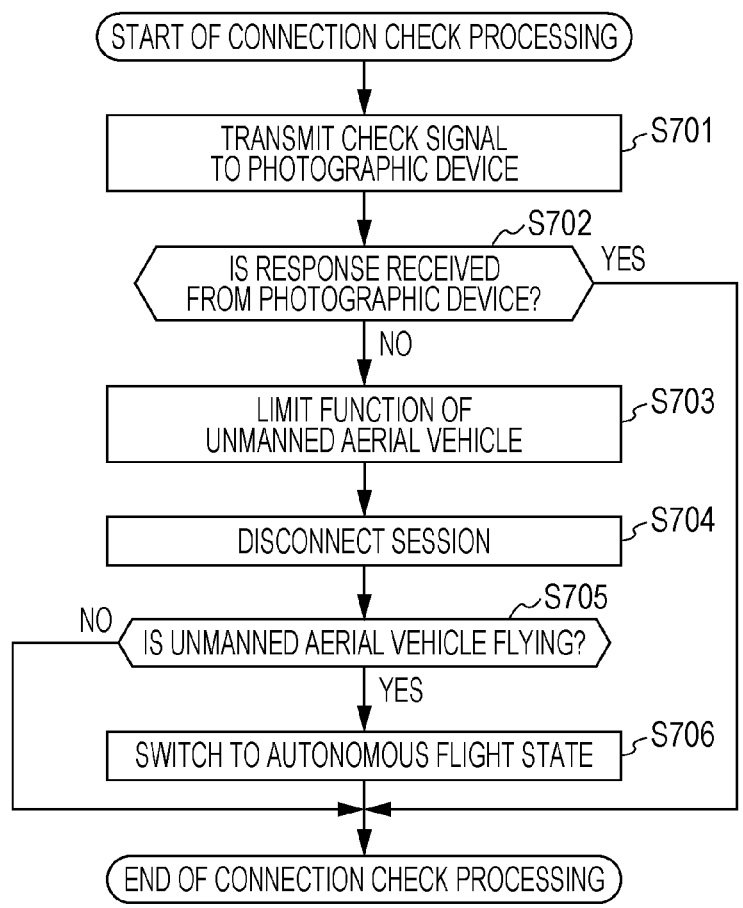
FIG. 12 is a flowchart illustrating one example of a flow of connection check processing performed by the unmanned aerial vehicle illustrated in FIG. 9.

FIG. 12 is a flowchart illustrating one example of a flow of connection check processing performed by the unmanned aerial vehicle 101a illustrated in FIG. 9. In FIG. 12, processes that are the same as or similar to those in FIG. 7 are denoted by the same reference numerals, and descriptions thereof are not given.

In the present embodiment, processes in steps S701 and S702 are executed, as in FIG. 7, and if a response to the check signal is not received from the photographic device 201a (NO in step S702), the process proceeds to step S703. In step S703, the authentication processor 308a disables the function of the propeller controller 303 and performs control so as not to receive an operation instruction from the control unit 301a.

In a process in steps S704, the authentication processor 308a determines whether or not the unmanned aerial vehicle 101a is flying (step S705). Upon determining that the unmanned aerial vehicle 101a is flying (YES in step S705), the authentication processor 308a enables the autonomous flight controller 310 to cause the unmanned aerial vehicle 101a to enter an autonomous flight state (step S706). Thereafter, the authentication processor 308a ends the connection check processing. At this point in time, the autonomous flight controller 310 executes an automatic return program, and the unmanned aerial vehicle 101a flies automatically to a position where it took off and makes a landing.

Upon determining that a response to the check signal is received from the photographic device 201a (YES in step S702), the unmanned aerial vehicle 101a is not in a flight state (NO in step S705), the authentication processor 308a ends the connection check processing.

The autonomous flight program executed in step S706 is not limited to the automatic return program, and any autonomous flight program that causes the unmanned aerial vehicle 101a that has become incapable of receiving an operation instruction as a result of the above-described function limitation to safely enter a stationary landing state. For example, the program may be replaced with a program for making a landing while maintaining the horizontal position.

(Advantages)

As described above, the unmanned aerial vehicle 101a can permit a photographic device authenticated to be a legitimate device, for example, the photographic device 201a (illustrated in FIG. 11) having a function for performing processing on an acquired image to make perception of a specific image region difficult, to perform aerial photography. On the other hand, with respect to a photographic device that does not have the above-described function and that is not a legitimate device, the unmanned aerial vehicle 101a does not authenticate the photographic device and limits the flight thereof to thereby make it possible to suppress aerial photography.

When it is determined in the periodically executed connection check processing that the photographic device mounted to the photographic-device mounting portion 102a is an illegitimate device that lacks the above-described function (i.e., when it is determined that impersonation is performed), and the unmanned aerial vehicle 101a is flying, the unmanned aerial vehicle 101a automatically enters an autonomous flight state and is put into a stationary state, thus forcibly suspending the aerial photography.

When the photographic device 201a mounted to the unmanned aerial vehicle 101a is a legitimate device and is used to perform aerial photography, an image that is acquired is an image in which a specific image region, that is, a region that can cause privacy violation, has been modified, thus making it possible to suppress execution of inappropriate aerial photography and to protect privacy.

The unmanned aerial vehicle according to the present disclosure has functions for authenticating a mounted photographic device and for performing an operation limitation and is useful as an unmanned aerial vehicle remotely controlled by an operator and as an unmanned aerial vehicle that performs autonomous flight based on pre-programmed content.

What is claimed is:

1. An unmanned aerial vehicle that performs flight based on a remote operation from a controller or that performs autonomous flight, the unmanned aerial vehicle comprising:
a frame to which a photographic device is mounted;
an authentication processor that establishes a communication session with the photographic device and then performs authentication on the photographic device; and
a receiver that communicates with the photographic device, the authentication processor establishing the communication session via the receiver,
the authentication processor performing the authentication on the photographic device by receiving information from the photographic device via the receiver during the communication session on whether the photographic device performs a predetermined function when operating, and determines whether or not the photographic device is a legitimate device that satisfies a predetermined aerial photography requirement based on the information received from the photographic device via the receiver during the communication session on whether the photographic device performs the redetermined function when operating,
wherein upon determining that the photographic device is not a legitimate device, the authentication processor performs operation limitation on a predetermined function of the unmanned aerial vehicle so that the photographic device is incapable of performing aerial photography.

2. The unmanned aerial vehicle according to claim 1, wherein the frame includes a motor that changes a photography direction of the photographic device in accordance with a remote operation from the controller; and
upon determining that the photographic device is not a legitimate device, the authentication processor limits the change of the photography direction of the photographic device so that the photographic device is incapable of performing aerial photography.

3. The unmanned aerial vehicle according to claim 2, wherein upon determining that the photographic device is not a legitimate device, the authentication processor controls the motor so as to fix the photography direction of the photographic device to a specific direction in which the photographic device is incapable of performing aerial photography.

4. The unmanned aerial vehicle according to claim 3, wherein the specific direction is a bottom surface direction of the unmanned aerial vehicle.

5. An unmanned aerial vehicle that performs flight based on a remote operation from a controller or that performs autonomous flight, the unmanned aerial vehicle comprising:
a frame to which a photographic device is mounted;
a receiver that communicates with the photographic device; and
an authentication processor that performs authentication on the photographic device by the receiver and that determines whether or not the photographic device is a legitimate device that satisfies a predetermined aerial photography requirement,
wherein upon determining that the photographic device is not a legitimate device, the authentication processor performs operation limitation on a predetermined function of the unmanned aerial vehicle so that the photographic device is incapable of performing aerial photography,
wherein the frame includes a motor that reduces motion blur in a moving image taken during aerial photography by the photographic device, and
upon determining that the photographic device is not a legitimate device, the authentication processor controls the motor so as not to reduce motion blur in a moving image taken during aerial photography by the photographic device.

6. The unmanned aerial vehicle according to claim 1, wherein, upon determining that the photographic device is not a legitimate device, the authentication processor limits a remote operation from the controller to the unmanned aerial vehicle.

7. The unmanned aerial vehicle according to claim 6, wherein upon determining that the photographic device is not a legitimate device, the authentication processor changes a flight of the unmanned aerial vehicle to an autonomous flight.

8. The unmanned aerial vehicle according to claim 1, wherein the aerial photography requirement is to embed, into video data acquired by the photographic device, photography condition information for tracking history of the video data acquired by the photographic device; and
upon determining that the photographic device is a legitimate device, the authentication processor controls the photographic device so as to embed the photography condition information obtained from the unmanned aerial vehicle via the receiver into the video data acquired by the photographic device.

9. The unmanned aerial vehicle according to claim 8, wherein the aerial photography requirement is to embed the photography condition information into the video data acquired by the photographic device, by using digital watermarking; and upon determining that the photographic device is a legitimate device, the authentication processor controls the photographic device so as to embed the photography condition information into the video data by using the digital watermarking.

10. The unmanned aerial vehicle according to claim 8, wherein the photography condition information is individual identification information with which the unmanned aerial vehicle is uniquely identifiable; and upon determining that the photographic device is a legitimate device, the authentication processor controls the photographic device so as to embed the individual identification information obtained from the unmanned aerial vehicle via the receiver into the video data acquired by the photographic device.

11. The unmanned aerial vehicle according to claim 1, wherein the aerial photography requirement is to recognize, in video data acquired by the photographic device, a specific image region that satisfies a predetermined condition and to perform image processing for making perception of the specific image region difficult, and upon determining that the photographic device is a legitimate device, the authentication processor controls the photographic device so as to recognize the specific image region and perform image processing for making perception of the specific image region difficult.

12. A control method for an unmanned aerial vehicle that has a frame to which a photographic device is mounted and that performs flight based on a remote operation from a controller or performs autonomous flight, the control method comprising:

establishing a communication session between the photographic device and an authentication processor via a receiver of the unmanned aerial vehicle that communicates with the photographic device;

performing authentication with the authentication processor on the photographic device by receiving information from the photographic device via the receiver during the communication session on whether the photographic device performs a predetermined function when operating, and determining whether or not the photographic device is a legitimate device that satisfies a predetermined aerial photography requirement based on the information received from the photographic device via the receiver during the communication session on whether the photographic device performs the predetermined function when operating; and performing operation limitation on a predetermined function of the unmanned aerial vehicle so that the photographic device is incapable of performing aerial photography, upon determining that the photographic device is not a legitimate device.

13. The unmanned aerial vehicle according to claim 1, wherein the authentication processor determines whether the photographic device has at least one of a privacy-protection function for preventing video images displayed to a user, representing acquired video data acquired by the photographic device, from revealing predetermined detail of an object photographed by the photographic device and represented by the acquired video data, and a traceability function for recording a tracking history of the acquired video data, the privacy-protection function and the traceability function each being the predetermined aerial photography requirement determined to be satisfied by the photographic device when the authentication processor determines that the photographic device has at least one of the privacy-protection function and the traceability function.

14. The unmanned aerial vehicle according to claim 1, wherein the authentication processor determines whether the photographic device performs at least one of:

embedding tracing information into acquired video data acquired by the photographic device, and processing the acquired video data to block perception of details of at least a region of a video image, representing the acquired video data and displayed for a user, by altering the appearance of the at least a region of the video image to obscure the details thereof, the embedding and the processing each being the predetermined aerial photography requirement determined to be satisfied by the photographic device when the authentication processor determines that the photographic device performs at least one of the embedding and processing operations.

15. The unmanned aerial vehicle according to claim 1, wherein the authentication processor determines whether the photographic device embeds tracking-history information into video data acquired by the photographic device, the function of embedding of the tracking-history information being the predetermined aerial photography requirement determined to be satisfied by the photographic device when the authentication processor determines that the photographic device embeds the tracking-history information into the video data.

16. The control method according to claim 12, wherein the authentication determines whether the photographic device has at least one of a privacy-protection function for preventing video images displayed to a user, representing acquired video data acquired by the photographic device, from revealing predetermined detail of an object photographed by the photographic device and represented by the acquired video data, and a traceability function for recording a tracking history of the acquired video data, the privacy-protection function and the traceability function each being the predetermined aerial photography requirement determined to be satisfied by the photographic device when the authentication processor determines that the photographic device has at least one of the privacy-protection function and the traceability function.

17. The control method according to claim 12, wherein the authentication determines whether the photographic device performs at least one of:

embedding tracing information into acquired video data acquired by the photographic device, and processing the acquired video data to block perception of details of at least a region of a video image, representing the acquired video data and displayed for a user, by altering the appearance of the at least a region of the video image to obscure the details thereof, the embedding and the processing each being the predetermined aerial photography requirement determined to be satisfied by the photographic device when the authentication processor determines that the photographic device performs at least one of the embedding and processing operations.

18. The control method according to claim 12, wherein the authentication determines whether the photographic device embeds tracking-history information into video data acquired by the photographic device, the function of embedding of the tracking-history information being the predetermined aerial photography requirement determined to be satisfied by the photographic device when the authentication processor determines that the photographic device embeds the tracking-history information into the video data.

* * * * *